(12) United States Patent
Chung et al.

(10) Patent No.: US 11,255,380 B2
(45) Date of Patent: Feb. 22, 2022

(54) BEARING ASSEMBLY AND ROTARY SHAFT APPARATUS EMPLOYING SAME

(71) Applicant: Delta Electronics, Inc., Taoyuan (TW)

(72) Inventors: Chi-Wen Chung, Taoyuan (TW); En-Yi Chu, Taoyuan (TW); Ming-Li Tsao, Taoyuan (TW); Hung-Wei Lin, Taoyuan (TW); Jen-Yuan Chen, Taoyuan (TW); Hsien-Lung Tsai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 22 days.

(21) Appl. No.: 16/787,856

(22) Filed: Feb. 11, 2020

(65) Prior Publication Data

US 2021/0062866 A1   Mar. 4, 2021

Related U.S. Application Data

(60) Provisional application No. 62/894,401, filed on Aug. 30, 2019.

(51) Int. Cl.
*F16C 33/12*   (2006.01)
*F16C 19/38*   (2006.01)
(Continued)

(52) U.S. Cl.
CPC ............ *F16C 33/122* (2013.01); *F16C 19/38* (2013.01); *F16C 25/06* (2013.01); *F16C 35/063* (2013.01); *F16C 2226/60* (2013.01)

(58) Field of Classification Search
CPC ........ F16C 19/525; F16C 19/55; F16C 19/38; F16C 25/06; F16C 35/083; F16C 33/122;
(Continued)

(56) References Cited

U.S. PATENT DOCUMENTS 3,141,708 A * 7/1964 Evangelista .......... F16C 35/045
                                                              384/132
3,900,232 A * 8/1975 Rode ....................... F16C 41/02
                                                              384/517
(Continued)

FOREIGN PATENT DOCUMENTS

CN   105917126 A   8/2016
CN   205956049 U   2/2017
(Continued)

*Primary Examiner* — Marcus Charles
(74) *Attorney, Agent, or Firm* — Kirton McConkie; Evan R. Witt

(57) ABSTRACT

A bearing assembly and a rotary shaft apparatus employing the same are provided. The bearing assembly is rotatably coupled with a first shaft and a second shaft. The first bearing housing includes a first annular recess having a first axial depth. The first bearing is connected with the first annular recess and the first shaft and has a first axial thickness. The second bearing housing includes a second annular recess having a second axial depth. The second bearing is connected with the first annular recess, the second annular recess and the second shaft and has a second axial thickness. The spacer is disposed between the first bearing and the second bearing and has a third axial thickness. The sum of the first axial thickness, the second axial thickness and the third axial thickness is greater than the sum of the first axial depth and the second axial depth.

16 Claims, 10 Drawing Sheets

(51) Int. Cl.
*F16C 25/06* (2006.01)
*F16C 35/06* (2006.01)
*F16C 35/063* (2006.01)

(58) Field of Classification Search
CPC ... F16C 35/067; F16C 35/063; F16C 2226/60
USPC ............... 384/517, 537, 542, 561–563, 569
See application file for complete search history.

(56) References Cited

U.S. PATENT DOCUMENTS

| | | | | |
|---|---|---|---|---|
| 5,969,449 | A * | 10/1999 | Obara | F16C 25/08 |
| | | | | 310/89 |
| 6,971,802 | B2 * | 12/2005 | Vezina | F16C 25/083 |
| | | | | 384/517 |
| 7,771,126 | B2 * | 8/2010 | Faass | F16C 27/00 |
| | | | | 384/535 |
| 9,103,375 | B2 * | 8/2015 | Seufert | F16C 19/386 |
| 9,657,713 | B2 | 5/2017 | Shirakawa et al. | |
| 2009/0190874 | A1 * | 7/2009 | Burner | F03D 80/70 |
| | | | | 384/480 |
| 2014/0169719 | A1 * | 6/2014 | Seufert | F16C 19/383 |
| | | | | 384/569 |
| 2018/0051678 | A1 * | 2/2018 | Fierro | F16C 19/385 |

FOREIGN PATENT DOCUMENTS

| | | | | |
|---|---|---|---|---|
| CN | 206309796 U | | 7/2017 | |
| EP | 0126607 A2 * | | 11/1984 | ............... F16C 25/06 |
| EP | 0916862 A2 * | | 5/1999 | ............. F16C 35/073 |
| EP | 0916862 A2 | | 5/1999 | |
| JP | 61192947 A * | | 8/1986 | ............... F16H 1/32 |
| TW | 465689 U | | 11/2001 | |
| TW | 200712349 A | | 4/2007 | |
| TW | M552594 U | | 12/2017 | |
| TW | 201807329 A | | 3/2018 | |
| WO | WO-2012001517 A1 * | | 1/2012 | ............... F01L 1/047 |
| WO | WO-2013156194 A1 * | | 10/2013 | ............. F16C 19/184 |

* cited by examiner

BEARING ASSEMBLY AND ROTARY SHAFT APPARATUS EMPLOYING SAME

CROSS-REFERENCE TO RELATED APPLICATION

This application claims the benefit of U.S. Provisional Application Ser. No. 62/894,401 filed on Aug. 30, 2019, and the entire contents of the above-mentioned patent application are incorporated herein by reference for all purposes.

FIELD OF THE INVENTION

The present disclosure relates to a bearing, and more particularly to a bearing assembly and a rotary shaft apparatus employing the same.

BACKGROUND OF THE INVENTION

Rotary shaft apparatus has been widely used in various industrial application for transmit power from one part to another. FIG. 1 is a cross-sectional view showing a conventional rotary shaft apparatus with a bearing. As shown in FIG. 1, the rotary shaft apparatus 1 comprises a shaft 11 and a bearing unit 12. The bearing unit 12 is used for rotatably coupling with the shaft 11 to reduce friction and support radial and axial loads when the shaft 11 is rotated. The bearing unit 12 comprises a bearing housing 121, an inner ring 122, an outer ring 123 and a plurality of balls 124. The inner ring 122, the outer ring 123 and the balls 124 are disposed in the bearing housing 121, and the balls 124 are interposed between the inner ring 122 and the outer ring 123.

Generally, in order to fasten the outer ring 123 within the bearing housing 121, a wave spring 125 is disposed in the gap between the outer ring 123 and the inner surface of the bearing housing 121. Although the wave spring 125 has benefits of simple structure and low cost and is easy to be assembled in the bearing unit 12, the rigidity of the bearing unit 12 with the wave spring 125 is insufficient. In case that the bearing unit 12 is thinned, the position of the wave spring 125 is hard to be controlled and the wave spring 125 may be in contact with a dust cover of the bearing unit 12 easily, which may result in unstable operation of the bearing unit 12.

Another manner may be employed to fasten the outer ring 123 within the bearing housing 121. For example, an adhesive layer (not shown) may be disposed in the gap between the outer ring 123 and the inner surface of the bearing housing 121. By using the adhesive layer to fasten the outer ring 123 within the bearing housing 121, the rigidity of the bearing unit 12 is enhanced. However, if the roundness of the outer ring 123 is not satisfied, the use of the adhesive layer may result in unstable operation of the bearing unit 12. In case that the bearing unit 12 is thinned, the above-mentioned issue is more obvious. Moreover, the dosage of the adhesive material is hard to be controlled. Furthermore, when the environmental temperature varies, the reliability of adhesive layer is reduced. In case that the outer ring 123 is made of steel and the bearing housing 121 is made of aluminum, the outer ring 123 and the bearing housing 121 have different coefficients of thermal expansion so that the above-mentioned issue is more obvious.

An interference-fit manner may be employed to fasten the outer ring 123 within the bearing housing 121. By using the interference-fit manner to fasten the outer ring 123 within the bearing housing 121, the rigidity and the precision of the bearing unit 12 are enhanced. However, high processing accuracy is required and the cost is increased. If the interference is not well controlled, it may result in unstable operation of the bearing unit 12. Moreover, the lifespan of the bearing unit 12 is reduced and the contact angle of the ball of the baring unit 12 is insufficient.

Therefore, there is a need of providing a bearing assembly and a rotary shaft apparatus employing the same to obviate the drawbacks encountered from the prior arts.

SUMMARY OF THE INVENTION

It is an object of the present disclosure to provide a bearing assembly and a rotary shaft apparatus employing the same without using a wave spring, an adhesive layer or an interference-fit manner to fasten the outer ring within the bearing housing so as to obviate the drawbacks encountered from the prior arts.

It is another object of the present disclosure to provide a bearing assembly and a rotary shaft apparatus having lower cost and higher rigidity and capable of being operated stably and being assembled easily.

In accordance with an aspect of the present disclosure, a bearing assembly is provided. The bearing assembly is rotatably coupled with a first shaft and a second shaft connected with the first shaft. The bearing assembly comprises a first bearing housing, a first bearing, a second bearing housing, a second bearing and a spacer. The first bearing housing comprises a first annular recess. The first annular recess has a first axial depth. One end of the first bearing is connected with the first annular recess of the first bearing housing. The other end of the first bearing is connected with the first shaft. The first bearing has a first axial thickness. The second bearing housing comprises a second annular recess. The second annular recess has a second axial depth. A bearing housing gap with an axial width is formed between the first bearing housing and the second bearing housing. One end of the second bearing is connected with the first annular recess of the first bearing housing and the second annular recess of the second bearing. The other end of the second bearing is connected with the second shaft. The second bearing has a second axial thickness. The spacer is disposed between the first bearing and the second bearing. The spacer has a third axial thickness. The sum of the first axial thickness, the second axial thickness and the third axial thickness is greater than the sum of the first axial depth and the second axial depth.

In accordance with an aspect of the present disclosure, a rotary shaft apparatus is provided. The rotary shaft apparatus includes a first shaft, a second shaft and a bearing assembly. The second shaft is connected with the first shaft. The bearing assembly is rotatably coupled with the first shaft and the second shaft. The bearing assembly comprises a first bearing housing, a first bearing, a second bearing housing, a second bearing and a spacer. The first bearing housing includes a first annular recess. The first annular recess has a first axial depth. One end of the first bearing is connected with the first annular recess of the first bearing housing. The other end of the first bearing is connected with the first shaft. The first bearing has a first axial thickness. The second bearing housing comprises a second annular recess. The second annular recess has a second axial depth. A bearing housing gap with an axial width is formed between the first bearing housing and the second bearing housing. One end of the second bearing is connected with the first annular recess of the first bearing housing and the second annular recess of the second bearing. The other end of the second bearing is connected with the second shaft. The second bearing has a second axial thickness. The spacer is disposed between the first bearing and the second bearing. The spacer has a third axial thickness. The sum of the first axial thickness, the second axial thickness and the third axial thickness is greater than the sum of the first axial depth and the second axial depth.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
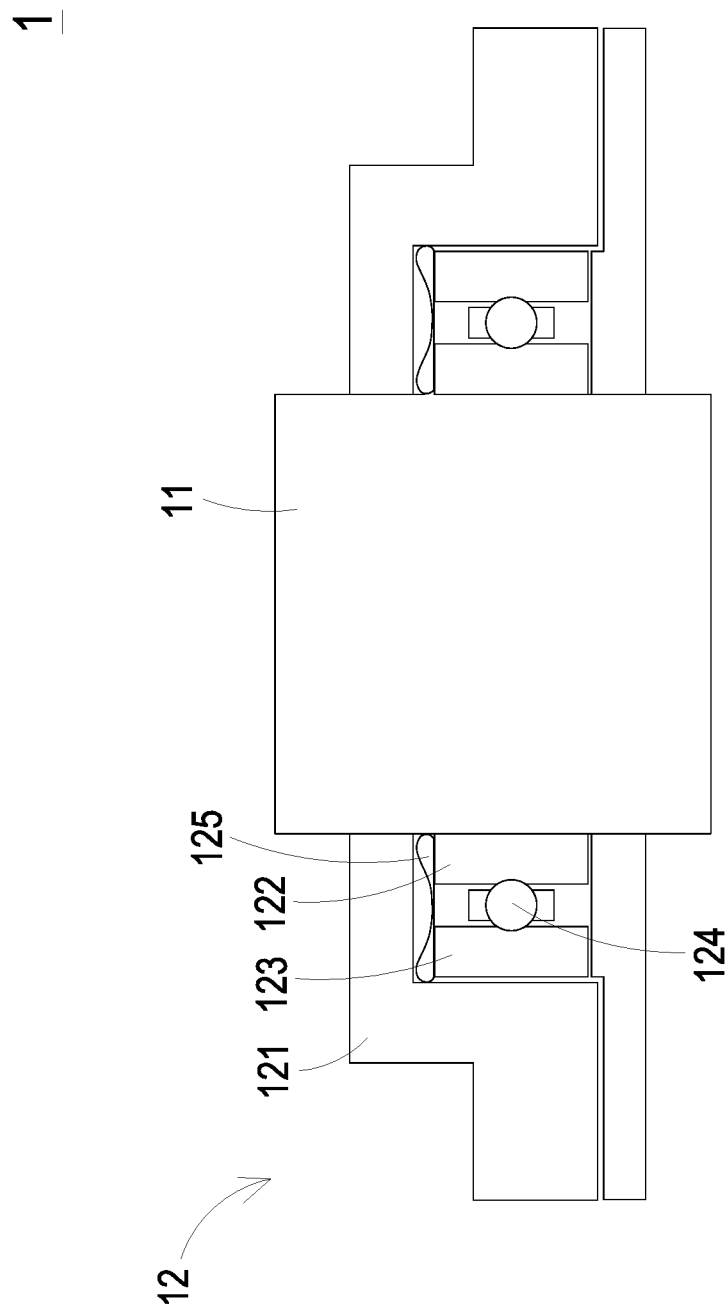
FIG. 1 is a cross-sectional view showing a conventional rotary shaft apparatus with a bearing.
Figure 2:
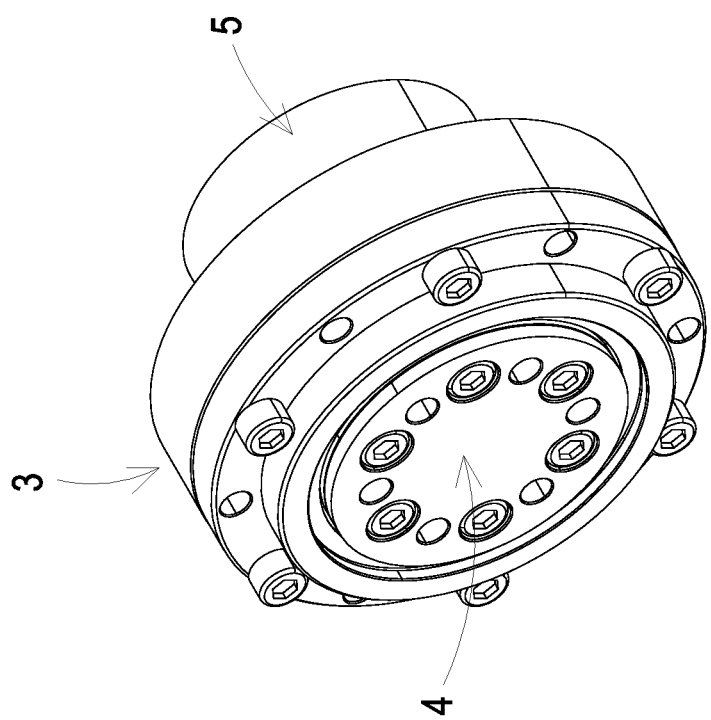
FIG. 2 is a schematic assembled view illustrating a rotary shaft apparatus with a bearing assembly according to a first embodiment of the present disclosure.
Figure 3:
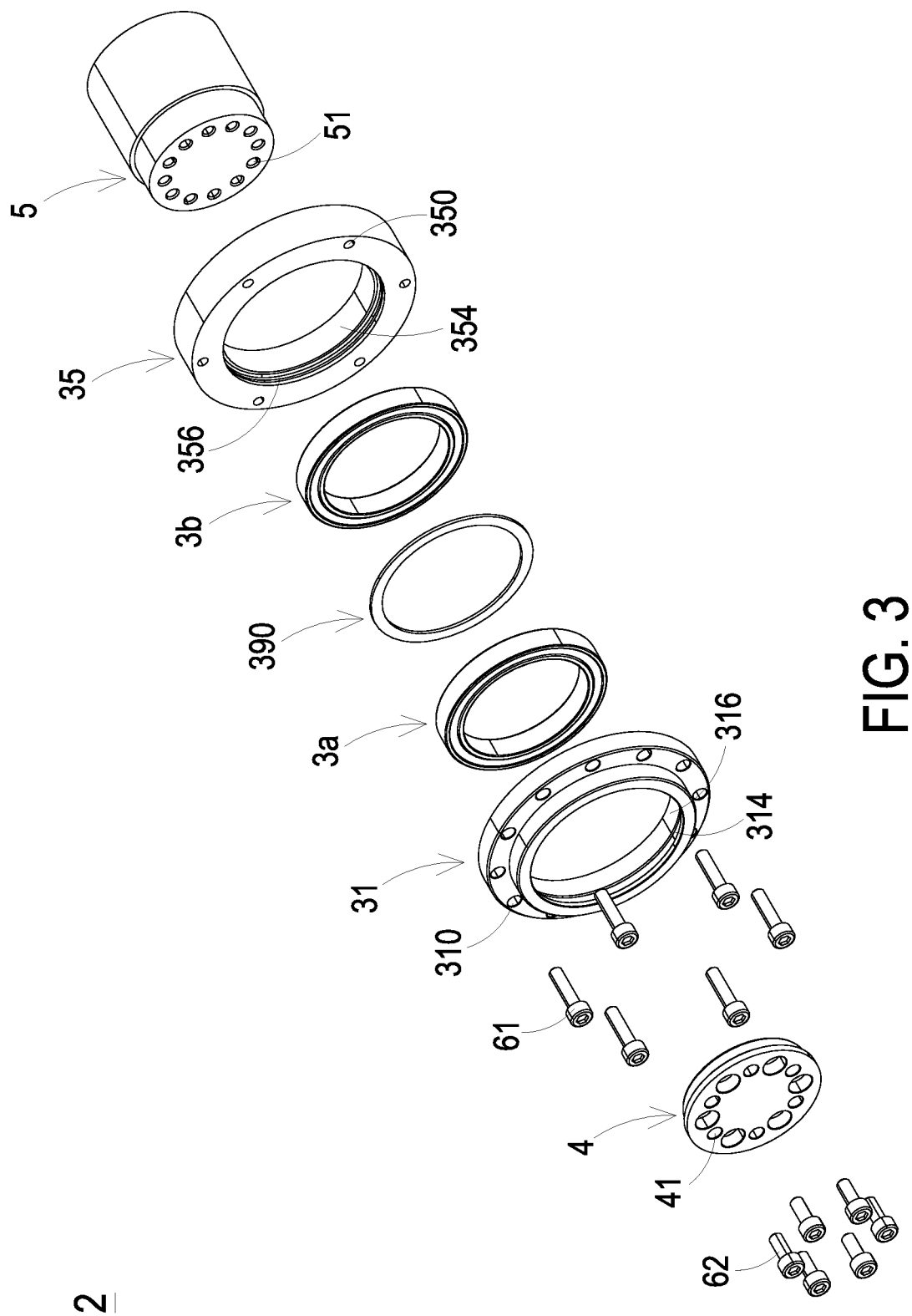
FIG. 3 is a schematic exploded view illustrating the rotary shaft apparatus of FIG. 2.
Figure 4:
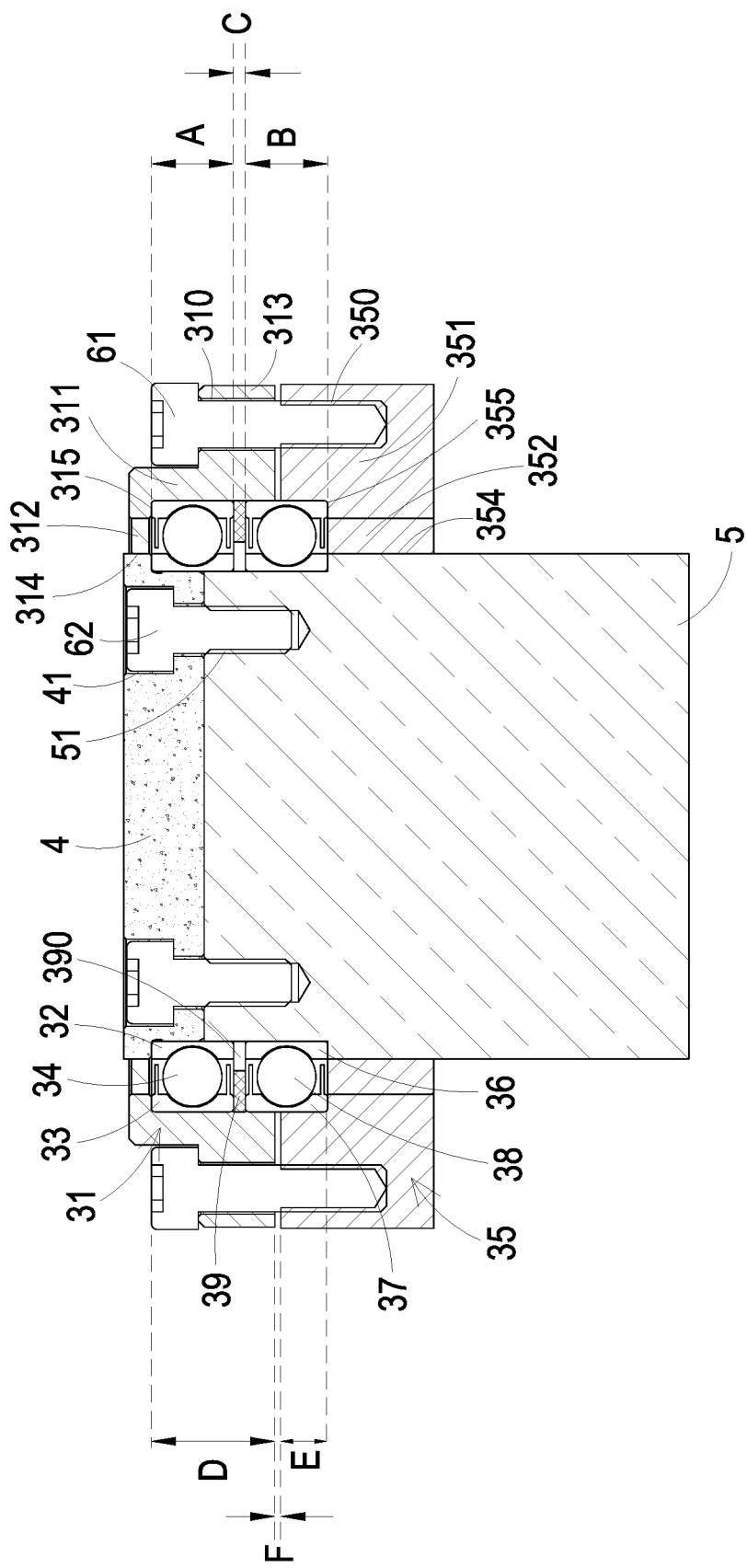
FIG. 4 is a cross-sectional view illustrating the rotary shaft apparatus of FIG. 2.

FIG. 2 is a schematic assembled view illustrating a rotary shaft apparatus with a bearing assembly according to a first embodiment of the present disclosure. FIG. 3 is a schematic exploded view illustrating the rotary shaft apparatus of FIG. 2. FIG. 4 is a cross-sectional view illustrating the rotary shaft apparatus of FIG. 2. As shown in FIGS. 2 to 4, the rotary shaft apparatus 2 of the present disclosure comprises a bearing assembly 3, a first shaft 4 and a second shaft 5. The bearing assembly 3 is used for rotatably coupling with the first shaft 4 and the second shaft 5. The first shaft 4 and the second shaft 5 are connected with each other and are axially arranged within the bearing assembly 3. The bearing assembly 3 comprises a first bearing housing 31, a first inner ring 32, a first outer ring 33, a first set of rolling elements 34, a second bearing housing 35, a second inner ring 36, a second outer ring 37, a second set of rolling elements 38 and a spacer 39.

The first bearing housing 31 comprises a first lateral wall 311, a first shoulder 312, a flange 313, a first bore 314, a first annular recess 315 and a first opening 316. The first lateral wall 311 is an annular peripheral wall of the first bearing housing 31. The first shoulder 312 is connected with one end of the first lateral wall 311 and outwardly extended along a radial direction toward the central of the first bearing housing 31. Preferably, the first shoulder 312 is vertically connected with one end of the first lateral wall 311. The flange 313 is connected with the other end of the first lateral wall 311 and outwardly extended along a direction opposite to the first shoulder 312. Preferably, the first flange 312 is vertically connected with the other end of the first lateral wall 311. The first bore 314 is formed in the first bearing housing 31 and is defined by the first shoulder 312. The first annular recess 315 is formed in the first bearing housing 31 and defined by the first lateral wall 311 and the first shoulder 312. The first annular recess 315 has a first axial depth D. Namely, the axial depth of the first bearing housing 31 is equal the first axial depth D of the first annular recess 315. The first opening 316 is defined by the first annular recess 315 and opposite to the first shoulder 312.

The first shaft 4 is disposed in the first bore 314 and arranged in the axial direction of the first bearing housing 31. The first inner ring 32 is disposed in the first bearing housing 31, is securely connected with the first shaft 4 and embraces the first shaft 4. The first outer ring 33 is disposed in the first bearing housing 31, located in the first annular recess 315, surrounding the first inner ring 32 and spaced apart with the first inner ring 32. The outer peripheral surface of the first outer ring 33 is in contact with the first lateral wall 311. The first set of rolling elements 34 is interposed between the first inner ring 32 and the first outer ring 33. Preferably but not exclusively, the first set of rolling elements 34 is a ball or a roller. The first outer ring 33 has a first axial thickness A. Besides, the first inner ring 32, the first outer ring 33 and the first set of rolling elements 34 form a first bearing 3a together. According to FIG. 4, because the first outer ring 33 of the first bearing 3a is connected with the first annular recess 315 and the first inner ring 32 of the first bearing 3a is connected with the first shaft 4, that means one end of the first bearing 3a is connected with the first annular recess 315 of the first bearing housing 31, and the other end of the first bearing 3a is connected with the first shaft 4.

The second bearing housing 35 comprises a second lateral wall 351, a second shoulder 352, a second bore 354, a second annular recess 355 and a second opening 356. The second lateral wall 351 is an annular peripheral wall of the second bearing housing 35. The second shoulder 352 is connected with one end of the second lateral wall 351 and outwardly extended along a radial direction toward the central of the second bearing housing 35. Preferably, the second shoulder 352 is vertically connected with one end of the second lateral wall 351. The second bore 354 is formed in the second bearing housing 35 and is defined by the second shoulder 352. The second annular recess 355 is formed in the second bearing housing 35 and defined by the second lateral wall 351 and the second shoulder 352. The second annular recess 355 has a second axial depth E. Namely, the axial depth of the second bearing housing 35 is equal the second axial depth E of the second annular recess 355. The second opening 356 is defined by the second annular recess 355 and opposite to the second shoulder 352.

The second shaft 5 is disposed in the second bore 354 and arranged in the axial direction of the second bearing housing 35. The second inner ring 36 is disposed in the first bearing housing 31 and the second bearing housing 35, is securely connected with the second shaft 5 and embraces the second shaft 5. The second outer ring 37 is disposed in the first bearing housing 31 and the second bearing housing 35 and is surrounding the second inner ring 36 and spaced apart with the second inner ring 36. Portion of the second outer ring 37 is located in the first annular recess 315, and the other portion of the second outer ring 37 is located in the second annular recess 355. The outer peripheral surface of the second outer ring 37 is in contact with the first lateral wall 311 and the second lateral wall 351. The second set of rolling elements 38 is interposed between the second inner ring 36 and the second outer ring 37. Preferably but not exclusively, the second set of rolling elements 38 is a ball or a roller. The second outer ring 37 has a second axial thickness B. Besides, the second inner ring 36, the second outer ring 37 and the second set of rolling elements 38 form a second bearing 3b together. According to FIG. 4, because the second outer ring 37 of the second bearing 3b is connected with the first annular recess 315 and the second annular recess 355, and the second inner ring 36 of the second bearing 3b is connected with the second shaft 5, that means one end of the second bearing 3b is connected with the first annular recess 315 and the second annular recess 355, and the other end of the second bearing 3b is connected with the second shaft 5.

In the embodiment, the bearing assembly 3 further comprises at least one first fastening element 61. The first bearing housing 31 has a first fixing hole 310. The first fixing hole 310 is formed on the flange 313. The second bearing housing 35 has a second fixing hole 350. The first fixing hole 310 is corresponding to and aligned with the second fixing hole 350. The first bearing housing 31 and the second bearing housing 35 are assembled together so that the first opening 316 is corresponding to and aligned with the second opening 356. The first bearing housing 31 and the second bearing housing 35 are assembled together by screwing the first fastening element 61 into the first fixing hole 310 and the second fixing hole 350. After the first bearing housing 31 and the second bearing housing 35 are assembled together, a bearing housing gap with an axial width F is formed between the first bearing housing 31 and the second bearing housing 35. In addition, portion of the second shaft 5 is disposed in the first bearing housing 31 and is in contact with the surface of the first inner ring 32.

In the embodiment, the bearing assembly 3 further comprises at least one second fastening element 62. The first shaft 4 has a third fixing hole 41. The third fixing hole 41 runs through the first shaft 4. The second shaft 5 has a fourth fixing hole 51. The fourth fixing hole 51 is formed on one end of the second shaft 5. The fourth fixing hole 51 is corresponding to and aligned with the third fixing hole 41. The first shaft 4 and the second shaft 5 are assembled together by screwing the second fastening element 62 into the third fixing hole 41 and the fourth fixing hole 51. The first shaft 4 and the second shaft 5 are cooperated with the first inner ring 32 and the second inner ring 36. Namely, the first shaft 4, the second shaft 5, the first inner ring 32 and the second inner ring 36 may be rotated synchronously. In an embodiment, the first outer ring 33, the second outer ring 37, the first bearing housing 31 and the second bearing housing 35 may be stationary when the first shaft 4, the second shaft 5, the first inner ring 32 and the second inner ring 36 are rotated synchronously. Alternatively, the first outer ring 33, the second outer ring 37, the first bearing housing 31 and the second bearing housing 35 may be rotated synchronously when the first shaft 4, the second shaft 5, the first inner ring 32 and the second inner ring 36 are stationary.

Figure 5B:
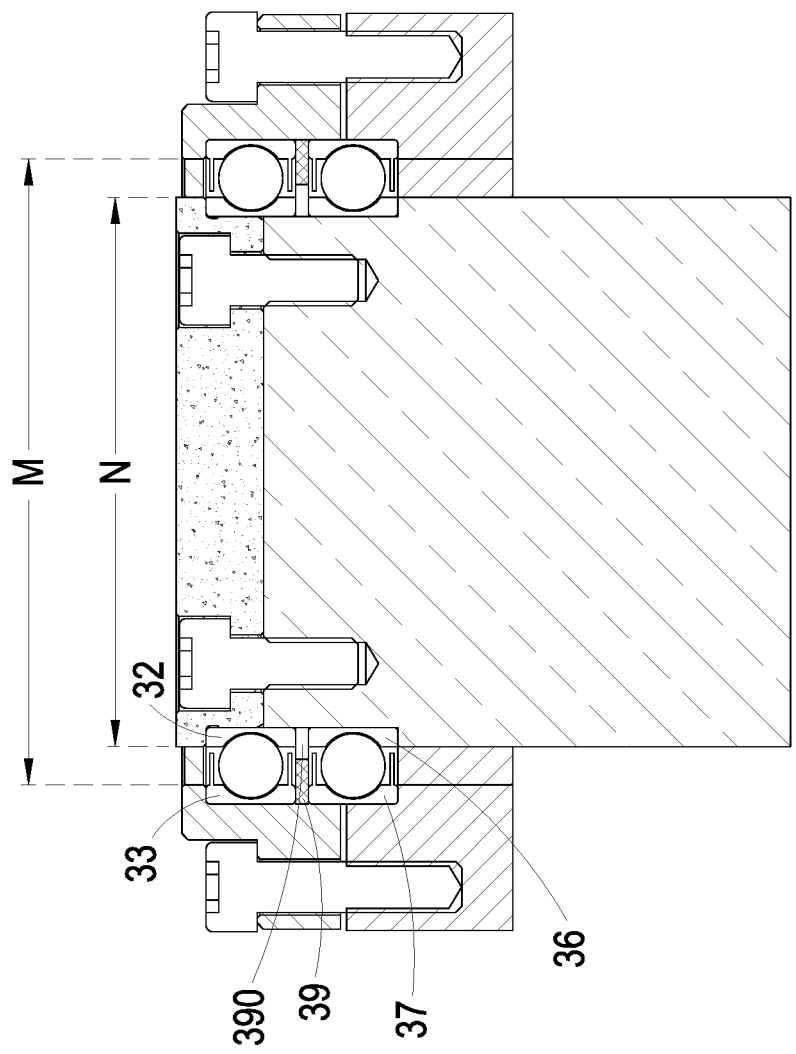
FIG. 5B is a cross-sectional view illustrating the arrangement and relationship among the spacer, the first inner ring, the first outer ring, the second inner ring and the second outer ring of the rotary shaft apparatus of FIG. 4.
Figure 5A:
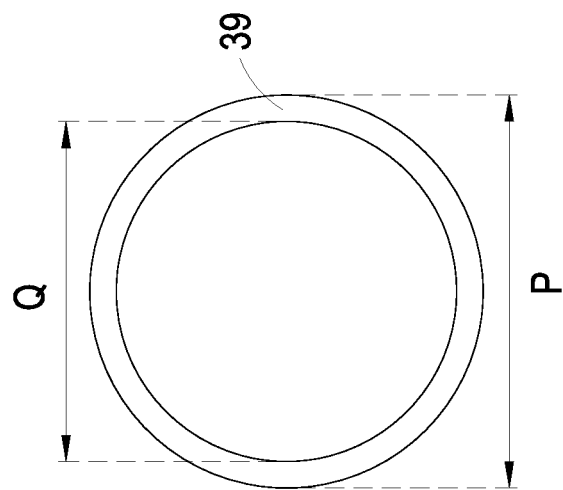
FIG. 5A is a perspective view illustrating a spacer of the rotary shaft apparatus of FIG. 4.

FIG. 5A is a perspective view illustrating a spacer of the rotary shaft apparatus of FIG. 4, and FIG. 5B is a cross-sectional view illustrating the arrangement and relationship among the spacer, the first inner ring, the first outer ring, the second inner ring and the second outer ring of the rotary shaft apparatus of FIG. 4. As shown in FIGS. 4, 5A and 5B, the spacer 39 is disposed between the combination of the first inner ring 32 and the first outer ring 33 and the combination of the second inner ring 36 and the second outer ring 37. Namely, a ring gap 390 is formed between the combination of the first inner ring 32 and the first outer ring 33 and the combination of the second inner ring 36 and the second outer ring 37, that means the ring gap 390 is formed between the first bearing 3a and the second bearing 3b, and the spacer 39 is disposed in the ring gap 390. Preferably, the spacer 39 is an annular washer, and the annular washer is disposed between the first outer ring 33 and the second outer ring 37. The spacer 39 has a third axial thickness C. Namely, the axial depth of the ring gap 390 is equal to the third axial thickness C of the spacer 39. In an embodiment, after the rotary shaft apparatus 2 is assembled, the sum of the first axial thickness A, the second axial thickness B and the third axial thickness C is greater than the sum of the first axial depth D and the second axial depth E (i.e. A+B+C>D+E). In an embodiment, the first outer ring 33 and the second outer ring 37 have a first inner diameter M, respectively and the first inner ring 32 and the second inner ring 36 have a first outer diameter N, respectively. The spacer 39 has a second outer diameter P and a second inner diameter Q in the radial direction. After the rotary shaft apparatus 2 is assembled, the second outer diameter P is greater than the first inner diameter M (i.e. P>M), and the second inner diameter Q is greater than the first outer diameter N (i.e. Q>N).

Figure 6:
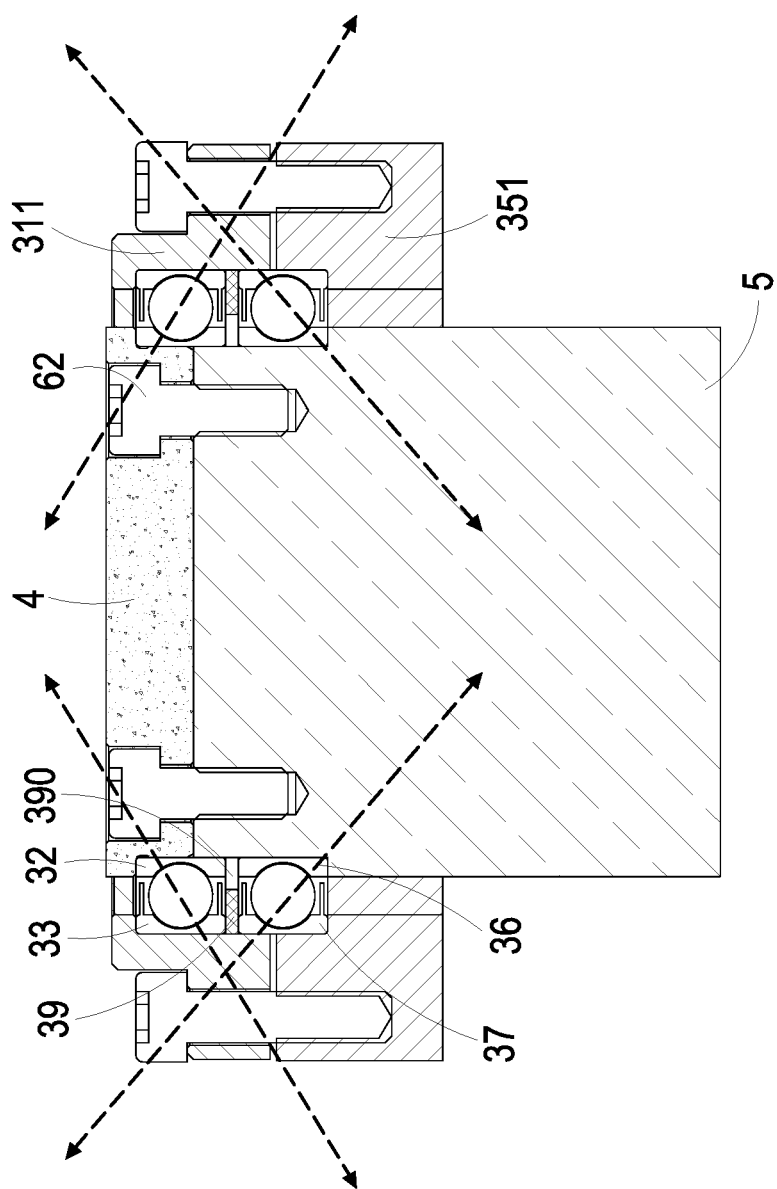
FIG. 6 shows the force distribution among the components of the rotary shaft apparatus of FIG. 4.

FIG. 6 shows the force distribution among the components of the rotary shaft apparatus of FIG. 4. As shown in FIGS. 4, 5A, 5B and 6, when the first shaft 4 and the second shaft 5 are securely connected with each other along the axial direction by using the second fastening element 62, the ring gap 390 is formed between the first inner ring 32 and the second inner ring 36, and the first outer ring 33 and the second outer ring 37 exert preloads upon the spacer 39 to tightly clamp the spacer 39 therebetween, that means the first bearing 3a and the second bearing 3b exert preloads upon the spacer 39 to tightly clamp the spacer 39 therebetween. Under this circumstance, the first inner ring 32 and the first outer ring 33 are offset with each other, and the second inner ring 36 and the second outer ring 37 are offset with each other. Consequently, the first shaft 4 and the second shaft 5 may exert forces toward the first outer ring 33 and the second outer ring 37 (i.e. the force distribution as shown in FIG. 6) so that the first outer ring 33 and the second outer ring 37 are tightly in contact with the first lateral wall 311 and the second lateral wall 351. Therefore, the rigidity of the bearing assembly 3 and the rotary shaft apparatus 2 are enhanced. In addition, the bearing housing gap with the axial width F (see FIG. 4) is formed between the first bearing housing 31 and the second bearing housing 35 after the rotary shaft apparatus 2 is assembled, so that it is not need to process the dimensions of the components with higher accuracy. The first outer ring 33 and the second outer ring 37 can be fastened within the first bearing housing 31 and the second bearing housing 35 securely. In addition, the adhesive layer can be omitted, so that the rotary shaft apparatus 2 and the bearing assembly 3 can be operated properly and stably when the environmental temperature is increased. The reliability of the rotary shaft apparatus 2 and the bearing assembly 3 are enhanced.

Figure 7:
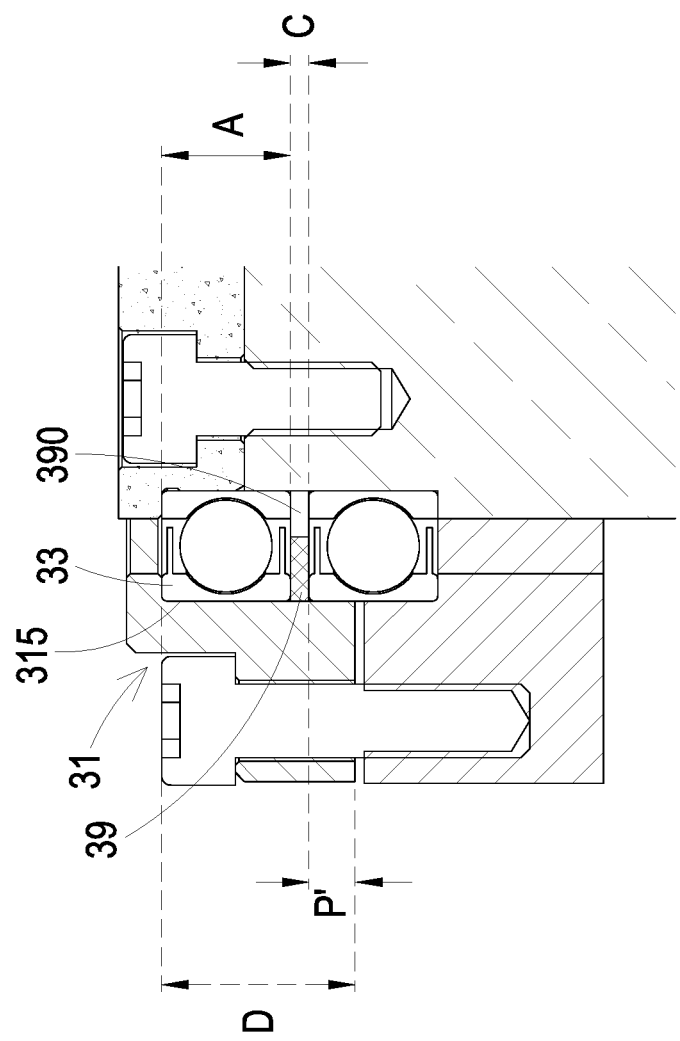
FIG. 7 is another cross-sectional view illustrating the arrangement and relationship among the spacer, the first inner ring, the first outer ring, the second inner ring and the second outer ring of the rotary shaft apparatus of FIG. 4.

FIG. 7 is another cross-sectional view illustrating the arrangement and relationship among the spacer, the first inner ring, the first outer ring, the second inner ring and the second outer ring of the rotary shaft apparatus of FIG. 4. As shown in FIGS. 4, 5A, 5B, 6 and 7, the first annular recess 315 of the first bearing housing 31 has the first axial depth D. The first outer ring 33 has the first axial thickness A. The spacer 39 has the third axial thickness C. The first axial depth D is greater than the sum of the first axial thickness A and the third axial thickness C (i.e. D>A+C). Under this circumstance, the spacer 39 can be installed in the ring gap 390 between the first outer ring 33 and the second outer ring 37 easily so that it is convenient for assembly. In addition, a space P' can be provided for guiding the second shaft 5 to be assembled into the first bearing housing 31.

Figure 8:
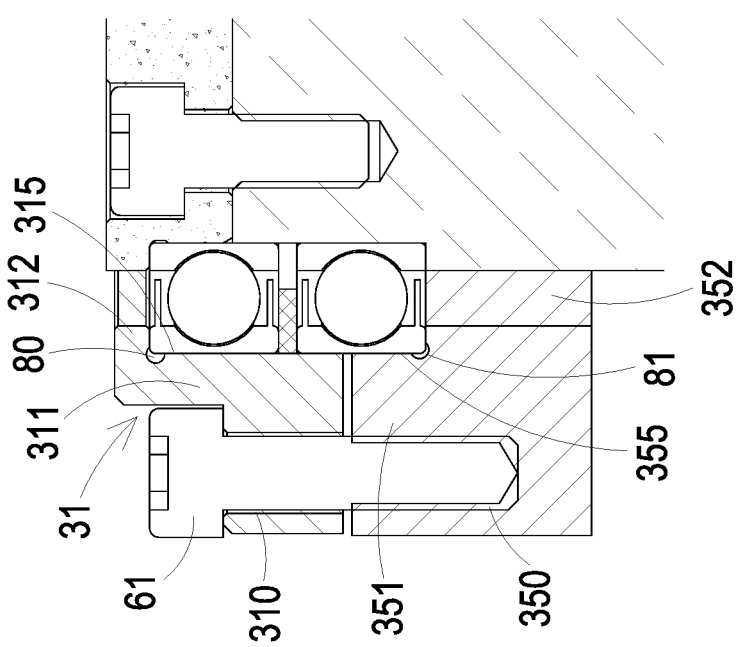
FIG. 8 is a cross-sectional view illustrating a rotary shaft apparatus with a bearing assembly according to a second embodiment of the present disclosure.

FIG. 8 is a cross-sectional view illustrating a rotary shaft apparatus with a bearing assembly according to a second embodiment of the present disclosure. Since the bearing housing gap with the axial width F is formed between the first bearing housing 31 and the second bearing housing 35, it is difficult to screw the first fastening element 61 into the first fixing hole 310 and the second fixing hole 350 when the rigidity of the first bearing housing 31 and the second bearing housing 35 are too high. In order to prevent the above-mentioned issue, as shown in FIG. 8, the first bearing housing 31 comprises a first annular groove 80 defined by the first lateral wall 311 and the first shoulder 312 and disposed at a corner of the first annular recess 315, and the second bearing housing 31 comprises a second annular groove 81 defined by the second lateral wall 351 and the second shoulder 352 and disposed at a corner of the second annular recess 355. The first annular groove 80 and the second annular groove 81 are respectively configured to adjust the rigidity of the first bearing housing 31 and the second bearing housing 35 to facilitate screwing the first fastening element 61 into the first fixing hole 310 and the second fixing hole 350. Moreover, an adhesive can be filled into the first annular groove 80 and the second annular groove 81 to enhance the securing force of the first outer ring 33 and the second outer ring 37.

Figure 9:
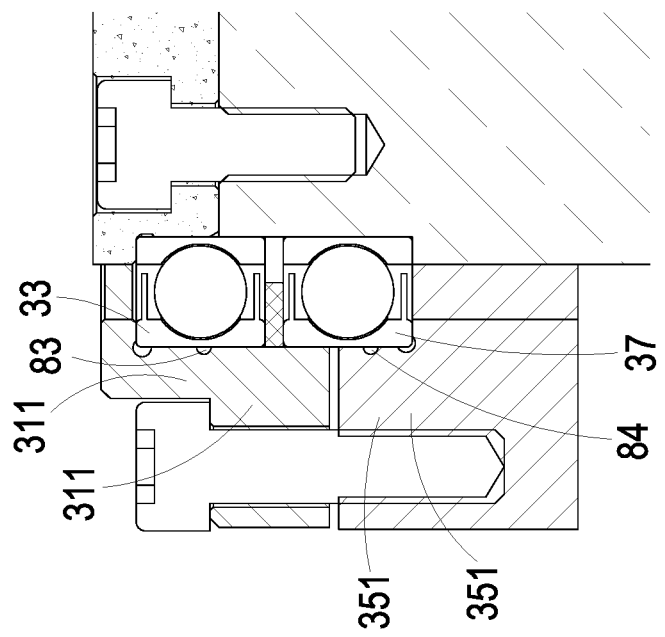
FIG. 9 is a cross-sectional view illustrating a rotary shaft apparatus with a bearing assembly according to a third embodiment of the present disclosure.

FIG. 9 is a cross-sectional view illustrating a rotary shaft apparatus with a bearing assembly according to a third embodiment of the present disclosure. In case that a coefficient of thermal expansion of the bearing housing is different from that of the outer ring (for example, the first bearing 3a and the second bearing 3b are made of steel, and the first bearing housing 31 and the second bearing housing 35 are made of aluminum), the first bearing housing 31 comprises a third annular groove 83 disposed in a contacting position between the first lateral wall 311 and the first outer ring 33, and the second bearing housing 35 comprises a fourth annular groove 84 disposed in a contacting position between the second lateral wall 351 and the second outer ring 37. A material with a high coefficient of thermal expansion, such as glue or o-ring, can be filled into the third annular groove 83 and the fourth annular groove 84. If the ambient temperature surrounding the bearing assembly 3 rises, a bearing housing gap may be formed between the bearing housing and the outer ring due to different coefficients of thermal expansion (for example, the coefficients of thermal expansion of the first bearing housing 31 and the second bearing housing 35 are greater than the coefficients of thermal expansion of the first outer ring 33 and the second outer ring 37, respectively). However, the material with high coefficient of thermal expansion within the third annular groove 83 and the fourth annular groove 84 can absorb the bearing housing gap to maintain the bearing assembly 3 and the rotary shaft apparatus 2.

Figure 10:
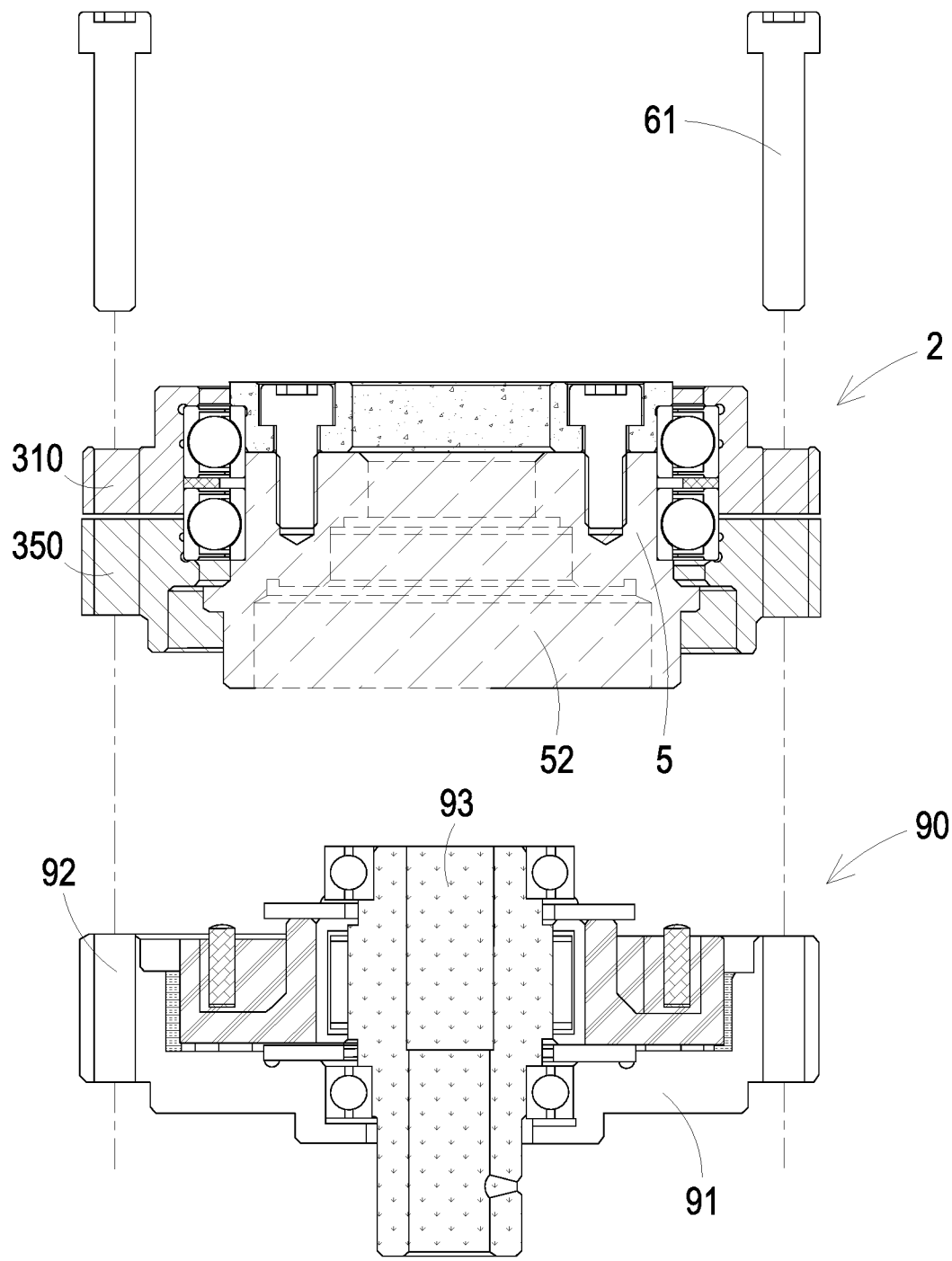
FIG. 10 is a schematic exploded view illustrating the rotary shaft apparatus of FIG. 9, a reducer and a third fastening element.
Figure 11:
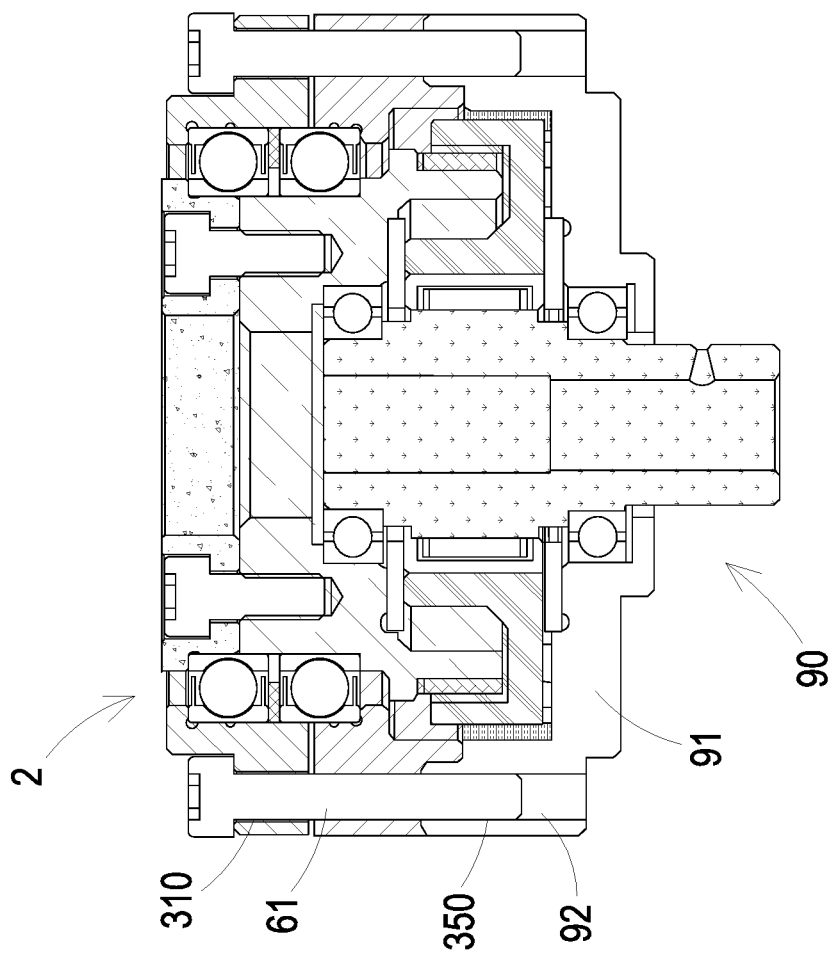
FIG. 11 is a schematic assembled view illustrating the rotary shaft apparatus, the reducer and the third fastening element of FIG. 10.

FIG. 10 is a schematic exploded view illustrating the rotary shaft apparatus of FIG. 9, a reducer and a third fastening element. FIG. 11 is a schematic assembled view illustrating the rotary shaft apparatus, the reducer and the third fastening element of FIG. 10. In some embodiments, the rotary shaft apparatus 2 can be assembled with a reducer 90, wherein the reducer 90 comprises a fixing housing 91 with at least one fifth fixing hole 92. The fifth fixing hole 92 is corresponding to and aligned with the first fixing hole 310 and the second fixing hole 350. The reducer 90 and the rotary shaft apparatus 2 are assembled together by screwing the first fastening element 61 into the first fixing hole 310, the second fixing hole 350 and the fifth fixing hole 93. As shown in FIGS. 10 and 11, the reducer 90 is assembled on one side of the rotary shaft apparatus 2 and is adjacent to the second shaft 5. Alternatively, the reducer 90 may be assembled on the other side of the rotary shaft apparatus 2 and is adjacent to the first shaft 4. In other embodiments, the second shaft 5 further comprises a hollow structure 52, wherein the hollow structure 52 is used to couple with a third shaft 93 of the reducer 90 so that the reducer 90 can be assembled on one side of the rotary shaft apparatus 2. Alternatively, the first shaft 4 comprises a hollow structure (not shown), wherein the hollow structure is used to couple with the third shaft 93 of the reducer 90 so that the reducer 90 can be assembled on the other side of the rotary shaft apparatus 2.

From the above descriptions, the present disclosure provides a bearing assembly and a rotary shaft apparatus employing the same without using a wave spring, an adhesive layer or an interference-fit manner to fasten the outer ring within the bearing housing so as to obviate the drawbacks encountered from the prior arts. The bearing assembly and the rotary shaft apparatus have lower cost and higher rigidity and are capable of being operated stably and being assembled easily.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A bearing assembly for rotatably coupling with a first shaft and a second shaft connected with the first shaft, the bearing assembly comprising:
   a first bearing housing comprising a first annular recess, wherein the first annular recess has a first axial depth;
   a first bearing, wherein a first outer side of the first bearing is connected with the first annular recess of the first bearing housing, a first inner side of the first bearing is connected with the first shaft, and the first bearing has a first axial thickness;
   a second bearing housing comprising a second annular recess, wherein the second annular recess has a second axial depth, and a bearing housing gap with an axial width is formed between the first bearing housing and the second bearing housing;

a second bearing, wherein a second outer side of the second bearing is connected with the first annular recess of the first bearing housing and the second annular recess of the second bearing, a second inner side of the second bearing is connected with the second shaft, and the second bearing has a second axial thickness; and a spacer disposed between the first bearing and the second bearing, wherein the spacer has a third axial thickness;

wherein the sum of the first axial thickness, the second axial thickness and the third axial thickness is greater than the sum of the first axial depth and the second axial depth.

2. The bearing assembly according to claim 1, wherein the first bearing comprises a first inner ring at the first inner side, a first outer ring at the first outer side and a first set of rolling elements, the first inner ring is connected with the first shaft, the first outer ring is located in the first annular recess, surrounding the first inner ring and spaced apart with the first inner ring, and the first set of rolling elements is interposed between the first inner ring and the first outer ring.

3. The bearing assembly according to claim 2, wherein the first outer ring has a first inner diameter, the first inner ring has a first outer diameter, the spacer has a second outer diameter and a second inner diameter in the radial direction, wherein the second outer diameter is greater than the first inner diameter, and the second inner diameter is greater than the first outer diameter.

4. The bearing assembly according to claim 1, wherein the second bearing comprises a second inner ring at the second inner side, a second outer ring at the second outer side, a second set of rolling elements, the second inner ring is connected with the second shaft, the second outer ring is surrounding the second inner ring and spaced apart with the second inner ring, portion of the second outer ring is located in the first annular recess, and other portion of the second outer ring is located in the second annular recess, wherein the second set of rolling elements is interposed between the second inner ring and the second outer ring.

5. The bearing assembly according to claim 4, wherein the second outer ring has a first inner diameter, the second inner ring has a first outer diameter, and the spacer has a second outer diameter and a second inner diameter in the radial direction, wherein the second outer diameter is greater than the first inner diameter, and the second inner diameter is greater than the first outer diameter.

6. The bearing assembly according to claim 1, wherein a ring gap is formed between the first bearing and the second bearing, and the spacer is disposed in the ring gap, and the first bearing and the second bearing exert preloads upon the spacer to tightly clamp the spacer therebetween.

7. The bearing assembly according to claim 1, wherein the first axial depth is greater than the sum of the first axial thickness and the third axial thickness.

8. The bearing assembly according to claim 1, wherein the bearing assembly further comprises at least one first fastening element, wherein the first bearing housing has a first fixing hole, the second bearing housing has a second fixing hole, the first fixing hole is corresponding to and aligned with the second fixing hole, and the first bearing housing and the second bearing housing are assembled together by screwing the first fastening element into the first fixing hole and the second fixing hole.

9. The bearing assembly according to claim 1, wherein the bearing assembly further comprises at least one second fastening element, wherein the first shaft has a third fixing hole, the third fixing hole runs through the first shaft, the second shaft has a fourth fixing hole, the fourth fixing hole is formed on one end of the second shaft, the fourth fixing hole is corresponding to and aligned with the third fixing hole, and the first shaft and the second shaft are assembled together by screwing the second fastening element into the third fixing hole and the fourth fixing hole.

10. The bearing assembly according to claim 1, wherein the first bearing housing comprises a first lateral wall, a first shoulder and a flange, wherein the first lateral wall is an annular peripheral wall of the first bearing housing, the first shoulder is connected with one end of the first lateral wall and outwardly extended along a radial direction toward the central of the first bearing housing, the flange is connected with the other end of the first lateral wall and outwardly extended along a direction opposite to the first shoulder, and the first annular recess is defined by the first lateral wall and the first shoulder.

11. The bearing assembly according to claim 10, wherein the second bearing housing comprises a second lateral wall and a second shoulder, wherein the second lateral wall is an annular peripheral wall of the second bearing housing, the second shoulder is connected with one end of the second lateral wall and outwardly extended along a radial direction toward the central of the second bearing housing, and the second annular recess is defined by the second lateral wall and the second shoulder.

12. The bearing assembly according to claim 11, wherein the first bearing housing comprises a first annular groove defined by the first lateral wall and the first shoulder and disposed at a corner of the first annular recess, and the second bearing housing comprises a second annular groove defined by the second lateral wall and the second shoulder and disposed at a corner of the second annular recess.

13. The bearing assembly according to claim 11, wherein the first bearing housing comprises a third annular groove disposed in a contacting position between the first lateral wall and the first outer ring, and the second bearing housing comprises a forth annular groove disposed in a contacting position between the second lateral wall and the second outer ring.

14. A rotary shaft apparatus, comprising:
a first shaft;
a second shaft connected with the first shaft; and
a bearing assembly for rotatably coupling with the first shaft and the second shaft, wherein the bearing assembly comprises:
a first bearing housing comprising a first annular recess, wherein the first annular recess has a first axial depth;
a first bearing, wherein a first outer side of the first bearing is connected with the first annular recess of the first bearing housing, a first inner side of the first bearing is connected with the first shaft, and the first bearing has a first axial thickness;
a second bearing housing comprising a second annular recess, wherein the second annular recess has a second axial depth, and a bearing housing gap with an axial width is formed between the first bearing housing and the second bearing housing;
a second bearing, wherein a second outer side of the second bearing is connected with the first annular recess of the first bearing housing and the second annular recess of the second bearing, a second inner side of the second bearing is connected with the second shaft, and the second bearing has a second axial thickness; and a spacer disposed between the first bearing and the second bearing, wherein the spacer has a third axial thickness;

wherein the sum of the first axial thickness, the second axial thickness and the third axial thickness is greater than the sum of the first axial depth and the second axial depth.

15. The rotary shaft apparatus according to claim 14, wherein the bearing assembly further comprises at least one first fastening element, the first bearing housing has a first fixing hole, the second bearing housing has a second fixing hole, the first fixing hole is corresponding to and aligned with the second fixing hole, and the first bearing housing and the second bearing housing are assembled together by screwing the first fastening element into the first fixing hole and the second fixing hole.

16. The rotary shaft apparatus according to claim 15, wherein the rotatory shaft apparatus is assembled with a reducer, wherein the reducer comprises a fixing housing with at least one fifth fixing hole, the fifth fixing hole is corresponding to and aligned with the first fixing hole and the second fixing hole, and the reducer and the rotary shaft apparatus are assembled together by screwing the first fastening element into the fifth fixing hole, the first fixing hole and the second fixing hole.

* * * * *